(12) United States Patent
Hase

(10) Patent No.: US 7,673,388 B2
(45) Date of Patent: Mar. 9, 2010

(54) METHOD OF FORMING FRACTURE START PORTION OF DUCTILE METAL PART AND FRACTURE START PORTION FORMING DEVICE

(75) Inventor: Hiroichi Hase, Mie (JP)

(73) Assignee: The Yasunaga Co., Ltd., Mie (JP)

( * ) Notice: Subject to any disclaimer, the term of this patent is extended or adjusted under 35 U.S.C. 154(b) by 1337 days.

(21) Appl. No.: 10/983,656

(22) Filed: Nov. 9, 2004

(65) Prior Publication Data

US 2005/0160597 A1   Jul. 28, 2005

(30) Foreign Application Priority Data

Nov. 12, 2003   (JP) .............................. 2003-382052

(51) Int. Cl.
*B21D 53/84* (2006.01)
*F16C 7/00* (2006.01)

(52) U.S. Cl. ........................ 29/888.09; 29/413; 29/416; 123/197.3

(58) Field of Classification Search .............. 29/888.09, 29/413, 415, 416, 564; 123/197.3; 403/279
See application file for complete search history.

(56) References Cited

U.S. PATENT DOCUMENTS

| 5,208,979 | A | | 5/1993 | Schmidt | |
|---|---|---|---|---|---|
| 5,449,418 | A | * | 9/1995 | Takagi et al. | 148/304 |
| 5,511,140 | A | * | 4/1996 | Cina et al. | 385/93 |
| 5,882,438 | A | | 3/1999 | Luchner et al. | |
| 5,974,663 | A | * | 11/1999 | Ikeda et al. | 29/888.09 |
| 6,329,022 | B1 | * | 12/2001 | Schlegel et al. | 427/455 |
| 6,367,151 | B1 | * | 4/2002 | Schlegel et al. | 29/888.09 |
| 6,379,754 | B1 | * | 4/2002 | Schlegel et al. | 427/446 |

(Continued)

FOREIGN PATENT DOCUMENTS

DE              220340 A1     3/1985

(Continued)

OTHER PUBLICATIONS

"Scribing," Mechanical Engineering, Apr. 1990, p. 41.

*Primary Examiner*—Essama Omgba
(74) *Attorney, Agent, or Firm*—Birch, Stewart, Koalsch & Birch, LLP

(57) ABSTRACT

This is a method of forming a fracture start portion of a ductile metal part on an inner circumferential face of a through hole by irradiating laser to an opposing position of the inner circumferential face of the thorough hole of the ductile metal part having a predetermined through hole and by forming a large number of recess portions separated with a predetermined distance at a predetermined interval from one opening to the other opening of the through hole, in which a recess part is formed, instead of by focusing the laser exactly onto the inner circumferential face of the through hole, by irradiating it onto the inner circumferential face of the through hole while defocusing from the inner circumferential face of the through hole by a predetermined amount as well as by supplying an assist gas to a position of the laser irradiation, and the laser is moved linearly at a predetermined speed from one side opening to the other side opening on the inner circumferential face of the through hole while irradiating the laser onto the inner circumferential face of the through hole at a predetermined pulse.

5 Claims, 7 Drawing Sheets

U.S. PATENT DOCUMENTS

| | | | |
|---|---|---|---|
| 6,513,238 B1 * | 2/2003 | Schlegel | 29/888.09 |
| 6,560,869 B1 * | 5/2003 | Schlegel et al. | 29/888.09 |
| 6,619,533 B1 * | 9/2003 | Hootman et al. | 228/112.1 |
| 6,874,229 B2 * | 4/2005 | Burns, Jr. | 29/888.09 |
| 2004/0025340 A1 * | 2/2004 | Kubota et al. | 29/888.09 |
| 2005/0160597 A1 * | 7/2005 | Hase | 29/888.09 |

FOREIGN PATENT DOCUMENTS

| | | |
|---|---|---|
| DE | 29519126 U | 4/1996 |
| EP | 0808228 B1 | 11/1997 |
| JP | 05-057469 | 3/1993 |
| JP | 2000-502149 | 2/2000 |
| JP | 2002-066998 | 3/2002 |
| JP | 2005144467 A * | 6/2005 |

\* cited by examiner

METHOD OF FORMING FRACTURE START PORTION OF DUCTILE METAL PART AND FRACTURE START PORTION FORMING DEVICE

This Nonprovisional application claims priority under 35 U.S.C. §119(a) on Patent Application No. 2003-382052 filed in Japan on Nov. 12, 2003, the entire contents of which are hereby incorporated by reference.

BACKGROUND

1. Field of the Invention

The present invention relates to a forming method and a forming device of a fracture start portion required when stretching and fracturing a ductile metal part such as a connecting rod, for example, as well as a fracturing method and a fracturing device of a ductile metal part.

2. Description of the Related Art

A halved part obtained by stretching and fracturing a ductile metal part is combined again to be used as a pair of products in some cases. An example of such a part is a connecting rod known as a part for vehicles. And a method of fracturing a connecting rod by applying a tensile stress on a large end of the connecting rod among the large end and a small end provided respectively at both ends of the connecting rod has been known. In such a fracturing method, a technique to form a groove of a large width and a small depth at a fracture portion through machining has been used for a long time (See, for example, U.S. Pat. No. 5,208,979 (pp. 1-3, FIG. 3).).

In the meantime, instead of a method of forming a connecting rod fracture portion using such machining, a method of forming a stress riser groove of smaller width and larger depth to be a trigger of connecting rod fracture using laser is also known (See, for example, U.S. Pat. No. 5,208,979 (pp. 1-3, FIG. 3).).

Also, in relation to formation of such a stress riser groove with laser, a method of forming a so-called fracture groove by continuously forming a recess part and a rib formed between the recess parts through use of the laser is also known (See, for example, U.S. Pat. No. 5,882,438 (pp. 5-6, FIG. 3).).

In the above methods of forming a groove for fracturing a connecting rod in a patent document 1 and a patent document 2, since laser is irradiated onto an inner circumferential surface of a connecting-rod large end with a fine pulse so as to form a so-called groove for fracture, influence of heat generated at a (specific) irradiation position of the laser is excessively transmitted to an adjoining position of the groove, and there is a fear that this extra heat might cause fusion more than necessary at a portion adjacent to the groove.

Also, by such a phenomenon, even though a groove of a predetermined width should be formed normally, the groove might be formed with an uneven groove width.

Therefore, when such a groove not in the desired shape is formed as a connecting-rod fracture start portion, a clean connecting-rod fracture surface can not be obtained in some cases.

SUMMARY OF THE INVENTION

An object of the present invention is to provide a method of forming a fracture start portion of a ductile metal part and a fracture start portion forming device as well as a method of fracturing a ductile metal part and a fracturing device which can form a fracture start portion of a ductile metal part according to design dimension without being affected by heat from an adjacent recess portion due to laser irradiation and can obtain a clean fracture surface through the fracture start portion of this ductile metal part.

In order to solve the above problem, the method of forming a fracture start portion of a ductile metal part according to the present invention is a method of forming a fracture start portion of a ductile metal part for forming the fracture start portion of the ductile metal part on an inner circumferential face of a through hole by irradiating laser to an opposing position of the inner circumferential face of the thorough hole of the ductile metal part having a predetermined through hole and by forming a large number of recess parts separated with a predetermined distance at a predetermined interval from one opening to the other opening of the through hole, comprising:

a step for forming a recess part, instead of focusing the laser exactly onto the inner circumferential face of the ductile metal part, by irradiating the laser onto the inner circumferential face of the through hole while defocusing from the inner circumferential face of the through hole of the ductile metal part by a predetermined amount as well as by supplying an assist gas to a position of the laser irradiation; and a step for forming a series of the recess parts lineally separated from each other with a predetermined distance on the inner circumferential face of the through hole of the ductile metal part by moving the laser linearly at a predetermined speed from the opening on one side to the opening on the other side of the inner circumferential face of the ductile metal part while irradiating the laser onto the inner circumferential face of the ductile metal part at a predetermined pulse, and the fracture start portion of the ductile metal part is formed by this.

By forming a large number of the recess parts separated with a predetermined distance at a predetermined interval by laser irradiation in this way, heat generated at each of the recess parts does not give a bad influence on the adjacent recess part any more, and each of the recess parts can be formed in the desired shape according to the design dimension.

Also, by irradiating the laser onto the inner circumferential face of the through hole with defocusing by a predetermined amount from the inner circumferential face of the through hole of the ductile metal part, a wide recess part opening in which dross is hardly accumulated can be obtained.

Preferably, as in the method of forming a fracture start portion of a ductile metal part of the present invention, in the method of forming a fracture start portion of a ductile metal part, the defocus amount of the laser from the inner circumferential face of the ductile metal part is in a range of +0.01 mm to +1.00 mm for a plus defocus amount and in a range of −0.01 mm to −1.00 mm for a minus defocus amount.

By irradiating the laser onto the inner circumferential face of the through hole of the ductile metal part with such a defocus amount, a recess part having a wide recess part opening in which dross is hardly accumulated can be formed without breaking the sharp shape of the recess-part tip end which is favorable for fracture.

Also, a fracture start portion forming device of a ductile metal part according to the present invention is a fracture start portion forming device of a ductile metal part provided with:

a positioning means for positioning and fixing the ductile metal part at a predetermined position; and a laser irradiating means for forming the fracture start portion of the ductile metal part on an inner circumferential face of a through hole by irradiating laser to an opposing of the inner circumferential face of the through hole of the ductile metal part so as to form a large number of recess parts separated with a predetermined distance at a predetermined interval from one opening to the other opening of the through hole, and the laser irradiating means comprising:

a laser irradiation part for forming the recess part, instead of focusing the laser exactly onto the inner circumferential face of the through hole of the ductile metal part, by irradiating the laser onto the inner circumferential face of the through hole while defocusing from the inner circumferential face of the through hole of the ductile metal part by a predetermined amount and at the same time by supplying an assist gas to a position of the laser irradiation;

a laser excitation part for exciting the laser with a predetermined pulse; and a laser movement part for moving the laser irradiated by the laser irradiation part linearly at a predetermined speed from the opening on one side to the opening on the other side of the inner circumferential face of the through hold of the ductile metal part, and the fracture start portion of the ductile metal part is formed by forming a series of the recess parts lineally separated from each other with the predetermined distance on the inner circumferential face of the through hole of the ductile metal part by this.

By using such a fracture start portion forming device, the ductile metal part can be fractured with a clean fracture surface when a predetermined tensile stress is applied to the ductile metal part.

Also, a method of fracturing a ductile metal part according to the present invention is a method of fracturing a ductile metal part for fracturing the ductile metal part by irradiating laser to an opposing position of an inner circumferential face of a through hole of the ductile metal part having a predetermined through hole and forming a large number of recess parts separated with a predetermined distance at a predetermined interval from one opening to the other opening of the through hole so as to form a fracture start portion of the ductile metal part on the inner circumferential face of the through hole, and by applying a tensile stress in the direction widening the fracture start portion and crossing the fracture start portion of the ductile metal part, comprising:

a step for forming a recess part, instead of focusing the laser exactly onto the inner circumferential face of the ductile metal part, by irradiating the laser onto the inner circumferential face of the through hole while defocusing from the inner circumferential face of the through hole of the ductile metal part by a predetermined amount as well as by supplying an assist gas to a position of the laser irradiation; and a step for forming a series of the recess parts lineally separated from each other with a predetermined distance on the inner circumferential face of the through hole of the ductile metal part by moving the laser linearly at a predetermined speed from the opening on one side to the opening on the other side of the inner circumferential face of the ductile metal part while irradiating the laser onto the inner circumferential face of the ductile metal part at a predetermined pulse, whereby the fracture start portion of the ductile metal part is formed, and the ductile metal part is fractured by applying the tensile stress to the fracture start portion of the ductile metal part.

By forming a large number of recess parts separated with a predetermined distance at a predetermined interval by laser irradiation in this way, heat generated at each of the recess parts does not give a bad influence on the adjacent recess part any more, and each of the recess parts can be formed in a desired shape according to the design dimension.

Also, by irradiating the laser onto the inner circumferential face of the through hole with defocusing by a predetermined amount from the inner circumferential face of the through hole of the ductile metal part, a wide recess part opening in which dross is hardly accumulated.

As mentioned above, when a predetermined tensile stress is applied to a ductile metal part, the ductile metal part can be fractured with a clean fracture surface.

Preferably, as in the method of fracturing a ductile metal part of the present invention, in the method of fracturing a ductile metal part, a defocus amount of the laser from the inner circumferential face of the ductile metal part is in a range of +0.01 mm to +1.00 mm for a plus defocus amount and in a range of −0.01 mm to −1.00 mm for a minus defocus amount.

By irradiating the laser onto the inner circumferential face of the through hole of the ductile metal part with such a defocus amount, a recess part having a wide recess part opening in which dross is hardly accumulated can be formed without breaking the sharp shape of the recess-part tip end which is favorable for fracture can be formed. By this, when a predetermined tensile stress is applied to a ductile metal part, the ductile metal part can be fractured with a clean fracture surface.

Also, a fracturing device of a ductile metal part according to the present invention is a fracturing device of a ductile metal part provided with:

a positioning means for positioning and fixing the ductile metal part at a predetermined position;

a laser irradiating means for forming the fracture start portion of the ductile metal part on an inner circumferential face of a through hole by irradiating laser to an opposing position of the inner circumferential face of the through hole of the ductile metal part so as to form a large number of recess parts separated with a predetermined distance at a predetermined interval from one opening to the other opening of the through hole; and a tensile fracturing device for fracturing the ductile metal part by applying a tensile stress in the direction widening the fracture start portion and crossing the fracture start portion of the ductile metal part, and the laser irradiating means comprising:

a laser irradiation part for forming the recess part, instead of focusing the laser exactly onto the inner circumferential face of the through hole of the ductile metal part, by irradiating the laser onto the inner circumferential face of the through hole while defocusing from the inner circumferential face of the through hole of the ductile metal part by a predetermined amount and at the same time by supplying an assist gas to a position of the laser irradiation;

a laser excitation part for exciting the laser with a predetermined pulse; and a laser movement part for moving the laser irradiation part linearly at a predetermined speed from the opening on one side to the opening on the other side of the inner circumferential face of the through hold of the ductile metal part, wherein the series of the recess parts separated from each other with a predetermined distance are formed straightly by the laser irradiating means on the inner circumferential face of the through hole of the ductile metal part, by which the fracture start portion of the ductile metal part is formed, and the ductile metal part is fractured from the fracture start portion by the tensile fracturing means which applies the tensile stress to the fracture start portion of the ductile metal part.

By using such a fracturing device, the ductile metal part can be fractured with a clean fracture surface.

Also, a method of manufacturing the fractured ductile metal part according to the present invention is to manufacture of the ductile metal part fractured using the fracturing method of a ductile metal part.

By manufacturing the ductile metal part fractured by such a fracturing method, a fractured ductile metal part with a clean fracture surface can be obtained.

BRIEF DESCRIPTION OF THE DRAWINGS

The foregoing and other features of the present invention will become apparent to those skilled in the art to which the present invention relates from reading the following description with reference to the accompanying drawings, in which.

DETAILED DESCRIPTION OF THE INVENTION

A fracturing device of a ductile metal part provided with a fracture start portion forming device of the ductile metal part according to an embodiment of the present invention will be describe below together with its fracture start portion forming method and a fracturing method. In the present invention, as an embodiment of the fracturing device of a ductile metal part provided with the fracture start portion forming device of the ductile metal part, a so-called connecting-rod fracture start portion forming device and a connecting rod fracturing device will be described.

First, the connecting-rod fracture start portion forming device will be described based on the drawings.

Figure 1:
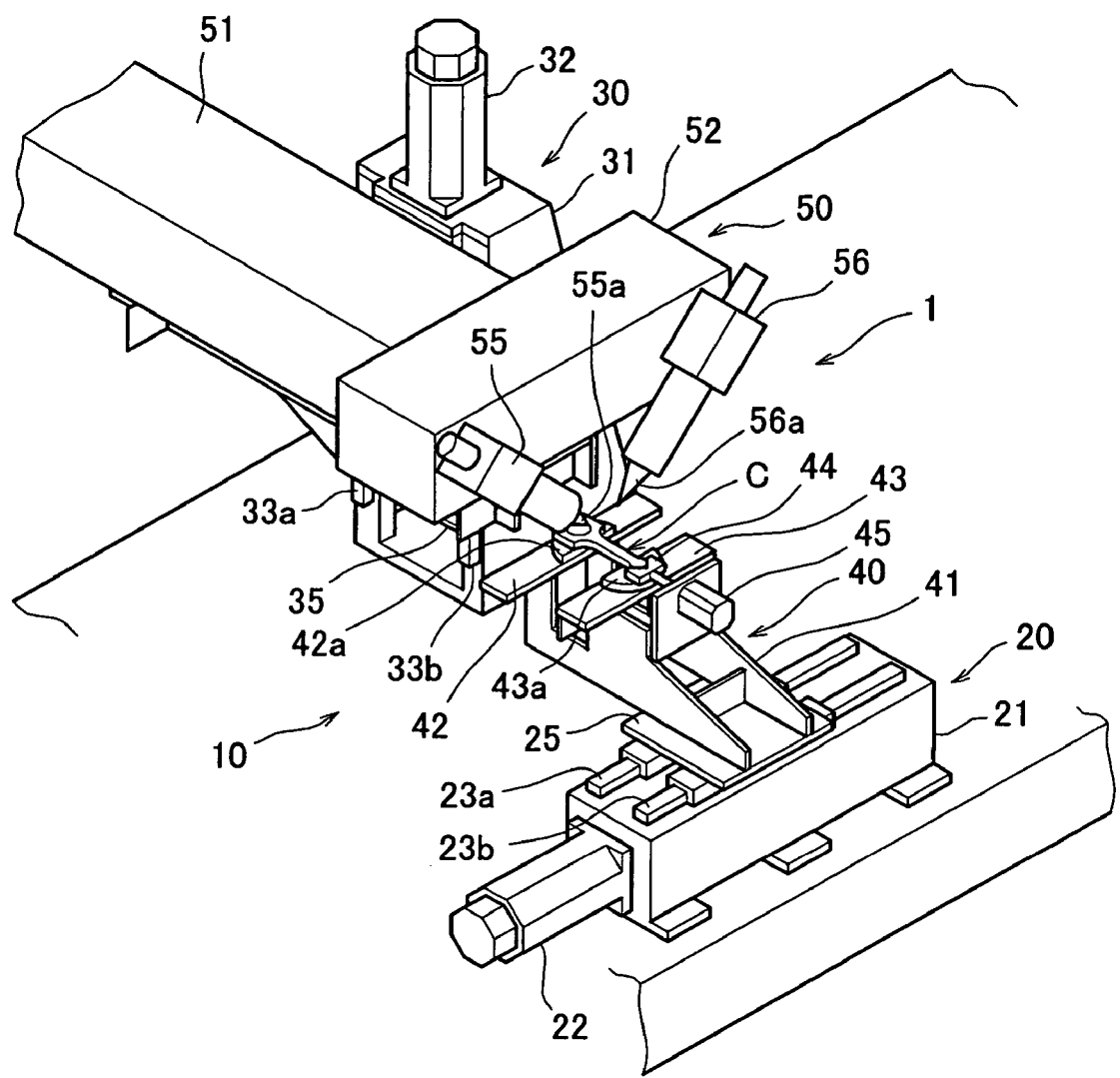
FIG. 1 is a perspective view showing a connecting-rod fracture start portion forming device according to an embodiment of the present invention.

Constitution of the connecting-rod fracture start portion forming device 1 is as shown in FIG. 1. To be concrete, the connecting-rod fracture start portion forming device is provided with a bed (base) 10 made of an elongated rectangular thick plate, an X-axis table device 20 provided with a slider 25 which can move in the longitudinal direction of the bed 10, a Y-axis table device 30 provided with a slider 35 which is installed in the vertical direction on an upper face of the bed 10 and can move in the vertical direction, a connecting-rod support part 40 mounted on the slider 25 of the X-axis table device 20, a laser irradiating device 50 mounted on the slider 35 of the Y-axis table device 30, etc.

The X-axis table device 20 is provided with a box-shaped housing 21, a servo motor 22 mounted at one end of the housing 21, two guide rails 23a, 23b mounted over the entire housing longitudinal direction on an upper face of the housing 21, the slider 25 which can move on the guide rails, a ball screw (not shown) provided inside the housing for moving the slider 25 in the X-axis direction according to rotation of the servo motor 22, etc.

Also, the Y-axis table device 30 is provided with a trapezoidal housing 31 when seen from the side, a servo motor 32 mounted on an upper face of the housing 31, two guide rails 33a, 33b mounted forming the vertical direction to the upper face of the bed 10 and in parallel with the housing 31, the slider 35 which moves on the guide rails in the Y-axis direction, a ball screw (not shown) provided inside the housing for moving the slider 35 in the Y-axis direction according to rotation of the servo motor 32, etc.

The connecting-rod support part 40 is provided with a bracket part 41 mounted on the slider 25 of the X-axis table device 20, plates 42, 43 arranged with an interval corresponding to a large end and a small end of a connecting rod C above the bracket part 41, a pressing part 44 for pressing the small end of the connecting rod C, an air cylinder 45 for pressing the pressing part 44 of the connecting rod C toward the connecting-rod small end, and a binding part (not shown) for binding a predetermined periphery portion of the connecting-rod large end. On the plates 42, 43 of the connecting-rod support part 40, bearing surfaces (spacers) 42a, 43a of a predetermined thickness are mounted for arranging the connecting rod C on the upper face of the bed 10 in parallel.

Also, a laser irradiating means 50 comprises a laser emission part 51, a laser guidance part 52 for guiding laser excited by the laser emission part 51 via a predetermined light path, and two laser irradiation parts 55, 56 mounted on both ends of the laser guidance part 52 and mounted at the laser guidance part 52 in the state forming a certain angle with each other. The laser irradiation parts 55, 56 are mounted on sides of the laser guidance part 52, and tip ends 55a, 56a which irradiate laser are arranged forming a certain angle with each other so that the lasers irradiated by the laser irradiation parts 55, 56 are crossed with each other.

Then, the interrelation between the connecting-rod supporting device 40 moved by the X-axis table device 20 in the longitudinal direction of the upper face of the bed 10 (X-axis direction), the laser irradiating device 50 moved by the Y-axis table device 30 in the vertical direction to the upper face of the bed 10 (Y-axis direction) and the connecting rod C mounted on the upper part of the connecting-rod supporting device 40 and a method of forming a fracture start portion based on it will be described.

The X-axis table device 20 is capable of mounting the connecting rod C for which the fracture start portion is to be formed at a predetermined mounting part of the connecting-rod supporting device 40 by positioning its slider 25 at one side end of the guide rails 23a, 23b. And by driving the X-axis table device 20, the connecting-rod supporting device 40 is moved in the neighborhood under the laser irradiation parts 55, 56. And one of the laser irradiation parts 55, 56 is positioned at one side in the radial direction of an opposing portion of the inner circumferential face of the connecting-rod large end. And the laser is excited by a predetermined pulse by having the laser emission part 51 emit laser, the laser is irradiated through one of the laser irradiation parts (laser irradiation part 55, for example) so as to irradiate the laser onto the inner circumferential face of the connecting-rod large end. This irradiation is achieved by a predetermined laser pulse.

Also, in irradiating the laser, instead of focusing the laser onto the surface of the inner circumference of the connecting-rod large end, the laser is irradiated while defocusing from the inner circumferential face of the connecting-rod large end so that the focus of the laser is slightly displaced from the surface of the inner circumference of the connecting-rod large end.

Figure 4:
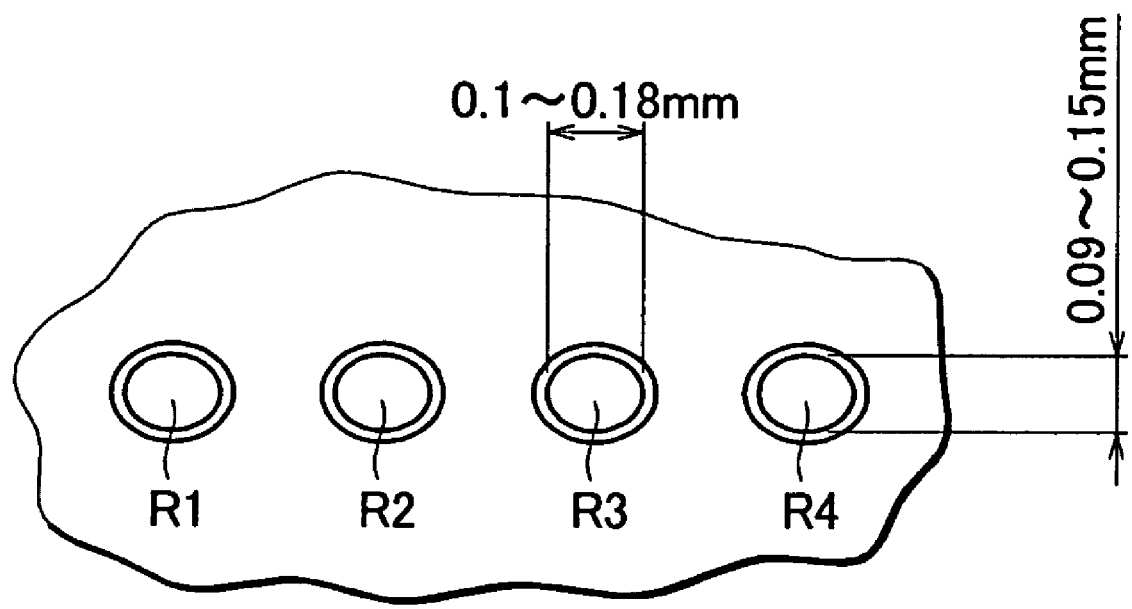
FIG. 4 is a partial view showing an enlarged recess part of the fracture start portion of the connecting rod in FIG. 3 seen from above the recess part.

And at the same time as such irradiation of the laser, the slider 35 of the Y-axis table device 30 is moved slowly in the vertical direction, for example, downward. By this, as will be mentioned later, on one side in the radial direction of the inner circumferential face of the connecting-rod large end, recess parts R1, R2 . . . (See FIG. 4) are formed as the fracture start portions while being separated from each other with a predetermined distance from one end opening to the other end opening.

Next, the slider 35 of the Y-axis table device 30 is returned to the original position, and the slider 25 of the X-axis table device 20 is moved so that the laser irradiated from the tip end of the other laser irradiation part (laser irradiation part 56, for example) hits a portion opposite to the fracture start portion previously formed on the inner circumferential face of the connecting-rod large end. And the laser is excited by a predetermined pulse by the laser emission part 51 and the laser is irradiated to the one-end opening of the large end of the connecting-rod large-end inner-circumferential face from the other laser irradiation parts (laser irradiation part 56, for example). At the same time, the slider 35 of the Y-axis table device 30 is moved again in one direction (downward, for example) and the laser is linearly irradiated to the other opening of the inner circumferential face of the connecting-rod large end. By this, as will be mentioned later, the recess parts R1, R2 . . . (See FIG. 4) are formed continuously and separated with a predetermined distance per the predetermined pulse also on the other of the inner circumferential face of the connecting-rod large end.

One example of a method of forming the above mentioned fracture start portion in the inner circumferential face of the connecting-rod large end will be described below in more detail. The following numeral values are for illustration except defocus amounts and not necessarily limited to them.

Figure 2A:
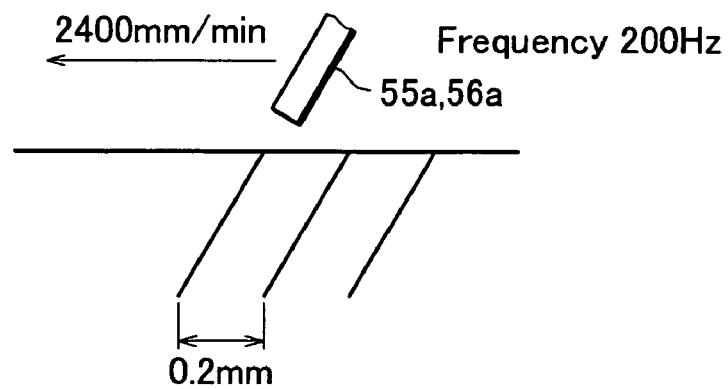
FIG. 2 is a diagram showing the moving direction of a laser irradiation part of the connecting-rod fracture start portion forming device shown in FIG. 1 and the laser irradiation direction (FIG. 2A) and a diagram showing a defocus amount of laser irradiation of the laser irradiation part of the connecting-rod fracture start portion forming device shown in FIG. 1 (FIG. 2B)

A dimensional relation between a frequency of an excitation pulse of the laser and the recess part is, as shown in FIG. 2A, determined by a frequency of pulse irradiation and a feeding speed scanning the laser. For example, in the case of irradiating with a frequency of 200 Hz and a recess-part pitch of 0.2 mm, the feeding speed scanning the laser is 2400 mm/min.

This is obtained by an equation: Feeding speed (mm/min) =Frequency (Hz)×60× Recess-part pitch (mm).

Also, if the excitation pulse of the laser has a frequency of 200 Hz, formation of a recess with a predetermined depth requires output of 30 W to 40 W. Actually, since irradiating conditions vary according to material, frequency and output will change according to it, but output is in a range of 10 W to 60 W in general.

Figure 2B:
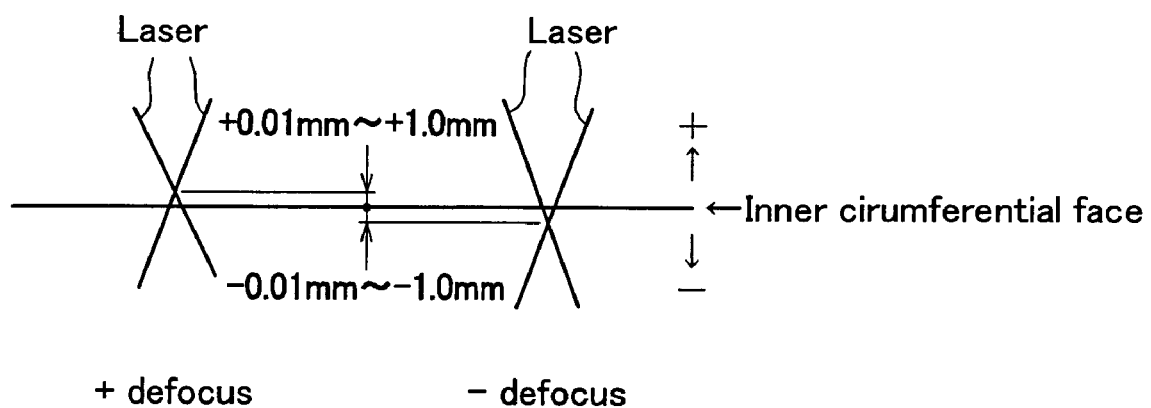

Also, in this preferred embodiment, in irradiating laser, as shown in FIG. 2B, instead of exactly focusing the laser onto the inner circumferential face of the connecting-rod large end, the laser is irradiated with defocusing from the inner circumferential face of the connecting rod so that the focus of the laser is slightly displaced from the inner circumferential face of the connecting-rod large end.

A defocus amount of the laser from the inner circumferential face of the connecting-rod large end is in a range of +0.01 mm to +1.00 mm for a plus defocus amount and in a range of −0.01 mm to −1.00 mm for a minus defocus amount. Here, the plus defocus means the case where the focus of the laser is outside the surface of the inner circumferential face of the connecting-rod large end to be irradiated, while the minus defocus means the case where the focus of the laser is on the side of a base metal rather than the surface of the inner circumferential face of the connecting-rod large end to be irradiated.

The defocus amount is varied depending on the material to be irradiated, and there are experientially more irradiating cases with plus defocus, but there may be irradiating with minus defocus depending on the material.

In this way, by slightly displacing the focus of the laser to be irradiated on the inner circumferential face of the connecting-rod large end from the laser inner circumferential face, as can be seen from the comparison result in FIG. 5, an opening of the recess part becomes wider as compared with the case where the laser to be irradiated on the inner circumferential face of the connecting-rod large end is exactly focused on the laser inner circumferential face.

That is because, by having the laser defocus from the inner circumferential face of the connecting-rod large end, an irradiation area of the laser to be irradiated on the inner circumferential face of the connecting-rod large end is supposed to become larger than the case where it is focused on the inner circumferential face of the connecting-rod large end.

As mentioned above, instead of defocus of the laser from the surface of the inner circumferential face of the connecting-rod large end, if the recess part separated at a predetermined interval is formed by focusing (just focus), the base metal is fused by the laser to a certain depth from the inner circumferential face of the connecting rod, and the recess part in which the fused base metal is accumulated is formed. This fused base metal re-coagulates and becomes irradiating scum (dross) (See FIG. 5B). During irradiating, an assist gas is blown into the laser irradiation part all the time to blow out the irradiating scum from inside the recess part to the outside, but if the laser is focused (just focus) to the inner circumferential face of the connecting-rod large end as mentioned above as in the conventional way, the opening of the recess part becomes narrow (See B2 of FIG. 5B), and such a recess part is formed, as mentioned in connection with formation of the stress riser groove in the patent document 1, that the opening width (corresponding to the groove width of the stress riser groove in the patent document 1) is small and the depth of the recess part (corresponding to the groove depth of the stress riser groove in the patent document 1) is large. However, in such a recess part with the narrow opening, the irradiating scum (dross) is not efficiently ejected through the opening but accumulates in the recess part, and after the laser irradiation position is displaced from the recess part for formation of an adjacent recess part, the irradiating scum (dross) re-coagulates, the recess part is divided in the depth direction (See B1 of FIG. 5B) and the recess part is not formed according to design dimension.

On the other hand, if the laser is irradiated with defocusing onto the inner circumferential face of the connecting-rod large end as in this preferred embodiment, since the opening of the recess part is made wider, the assist gas sufficiently goes into the recess part, and the irradiating scum (dross) is efficiently ejected through this opening, whereby such a problem will not occur.

Figure 5A:
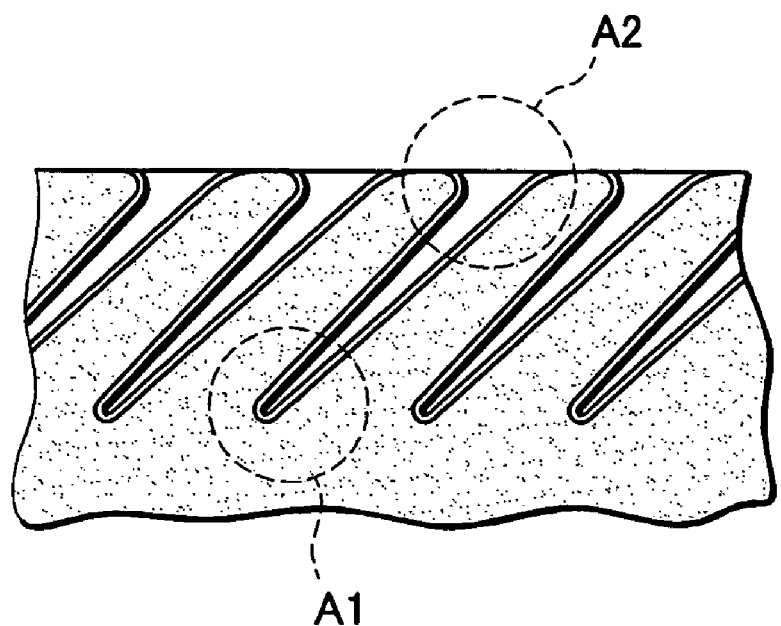
FIG. 5 is a cross-sectional view of the recess part shown in FIGS. 3 and 4 (FIG. 5A) and a cross-sectional view showing the state of irradiation without laser defocusing (with just focus, that is, with focusing) (FIG. 5B)
Figure 5B:
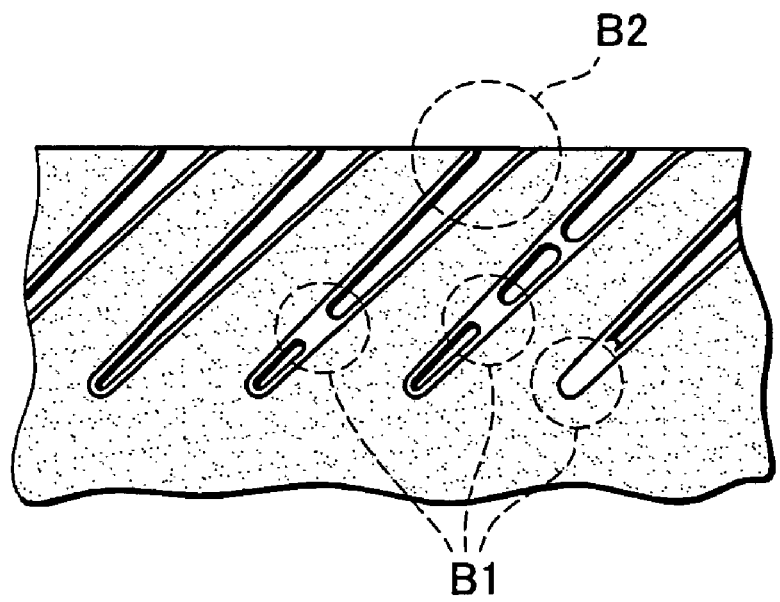

That is, by forming the recess part with this defocus amount, the recess part does not break the sharp shape of the recess-part tip end which is favorable for fracture (See A1 of FIG. 5A) and can gain a wider recess-part opening in which the dross is hardly accumulated (See A2 of FIG. 5A).

Figure 6:
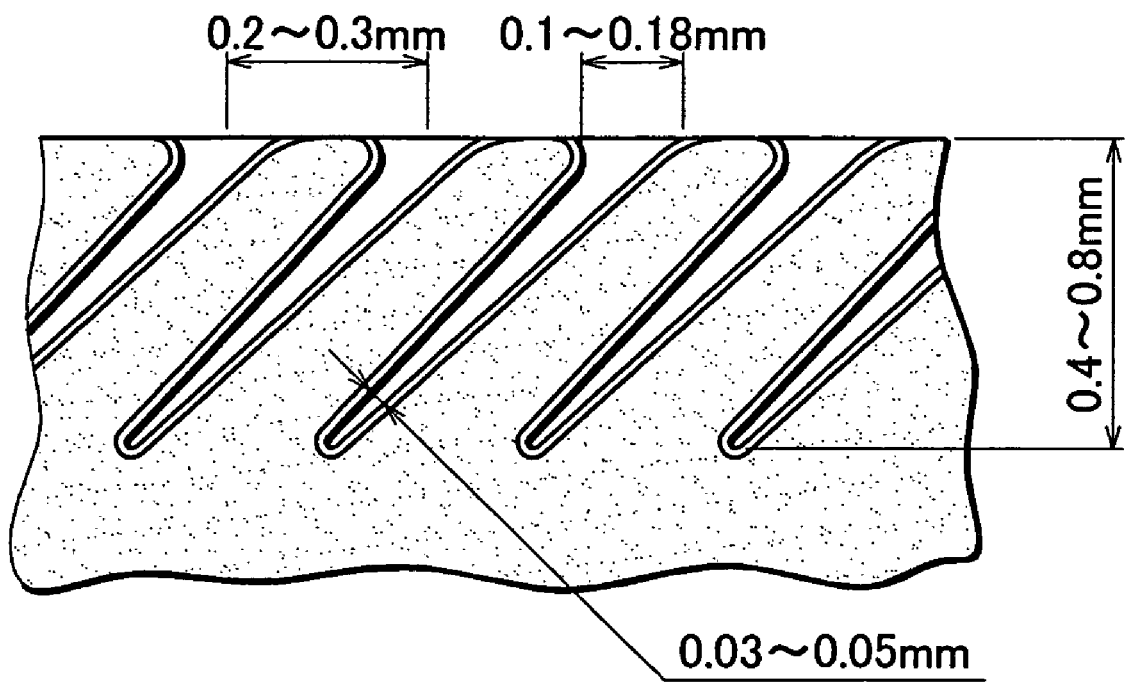
FIG. 6 is a cross-sectional view showing an enlarged recess part of the connecting-rod fracture start portion in FIG. 3.

FIG. 6 is a cross sectional view showing the shape of the recess part formed in this way and its concrete dimension as an example.

By deliberately making the recess-part opening wider in this way, the irradiating scum (dross) generated during irradiating is easily ejected from the recess part by the assist gas, and the irradiating scum (dross) is hardly accumulated.

By this, as can be seen from comparison in FIG. 6, the irradiating scum generated by laser irradiation can project outside through the opening of the wider recess part easily. As a result, the irradiating scum does not accumulate inside the recess part any more. With that, the ductile metal part can be fractured with a clean fracture surface when a predetermined tensile stress is applied to the ductile metal part.

As mentioned above, by constituting the connecting-rod fracture start portion by the recess parts separated from each other, the opening of the recess part is not a groove as set forth in the patent document 1 or the patent document 2, and disadvantages caused by constitution of a recess-part opening zone of a limited area can be solved.

As explained above, according to the fracturing method of a connecting rod in this preferred embodiment, the recess parts are continuously formed by applying laser onto the inner circumferential face of the connecting-rod large end at a predetermined interval. And the inner circumferential face of the connecting-rod large end can be left between adjacent recess parts still without forming a groove even though somewhat affected by heat. By this, the heat generated in each of the recess parts does not give a bad influence to the adjacent recess parts, and each of the recess parts can be formed in the desired shape at a predetermined interval.

That is, by forming such a fracture generation part, disadvantages such as fusion deformation of a groove due to interaction of heat between adjacent recess parts caused by formation of the groove in the patent document 1 or the patent document 2 do not occur.

Also, by irradiating laser while defocusing by a predetermined amount from the surface of the inner circumferential face of the connecting-rod large end, the recess-part opening is formed somewhat wider, the irradiating scum (dross) can be blown out outside by the assist gas, and the irradiating scum (dross) does not accumulate in the recess part.

Figure 3:
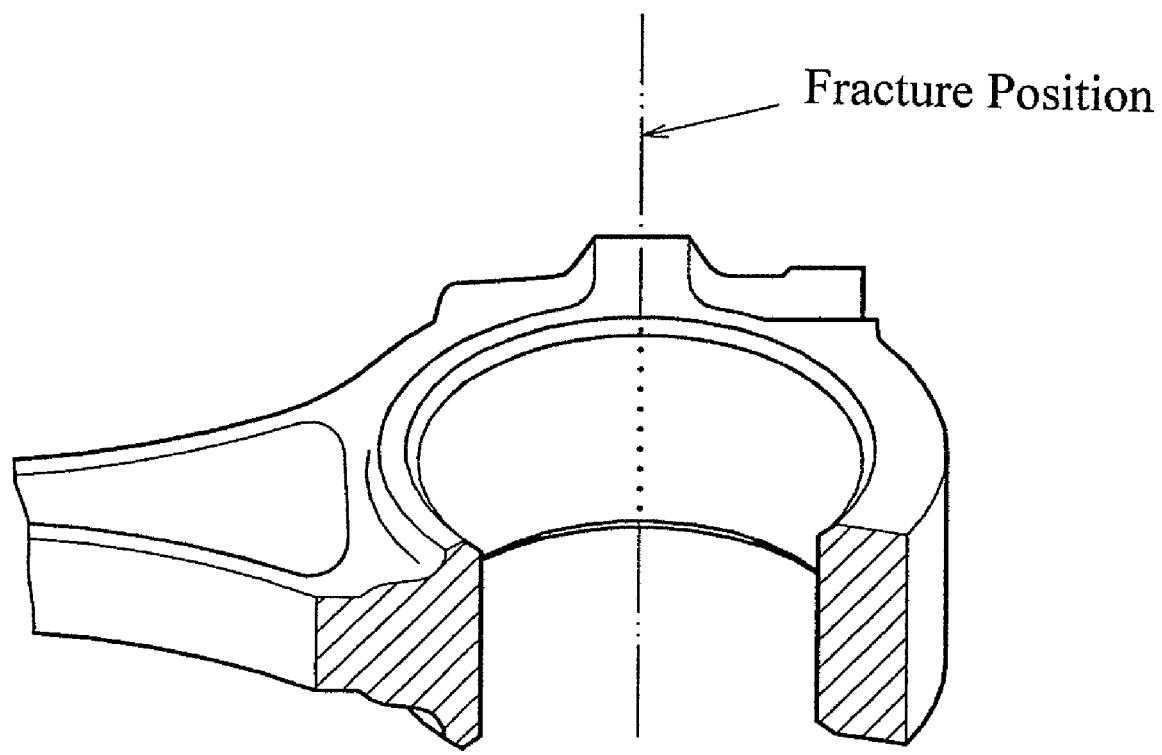
FIG. 3 is a perspective view showing a connecting-rod fracture start portion formed by the connecting-rod fracture start portion forming device shown in FIG. 1 with a part of a large end of the connecting rod removed.

As mentioned above, the connecting-rod start portion R (R1, R2 . . . ) (See FIGS. 3 and 4) is formed according to the design dimension, consisting of a series of recess parts in the even shape not affected by heat from the adjacent recess part due to laser irradiation and having a wide and deep opening over the entire fracture face start portion with no irradiating scum (dross) accumulated inside.

By this, a work to form the fracture start portion R at a position opposing the inner circumferential face of the connecting-rod large end is finished.

After the fracture start portion is formed in this way on the inner circumferential face of so formed connecting-rod large end, the slider 25 of the X-axis table device 20 is moved to the end in the predetermined direction (the other direction) so as to release pressing of an air cylinder onto the connecting rod, and the connecting rod C is removed from the connecting-rod support part 40. The removed connecting rod C is mounted onto a connecting-rod fracturing device 2 provided separately from the connecting-rod fracture start portion forming device so as to fracture the connecting rod C by applying a predetermined tension to the large end of the connecting rod.

Then, the connecting-rod fracturing device for obtaining a clean connecting-rod fracture face from the connecting-rod fracture start portion by applying a tensile stress on both ends of the connecting rod C will be described below based on the drawings.

Figure 7:
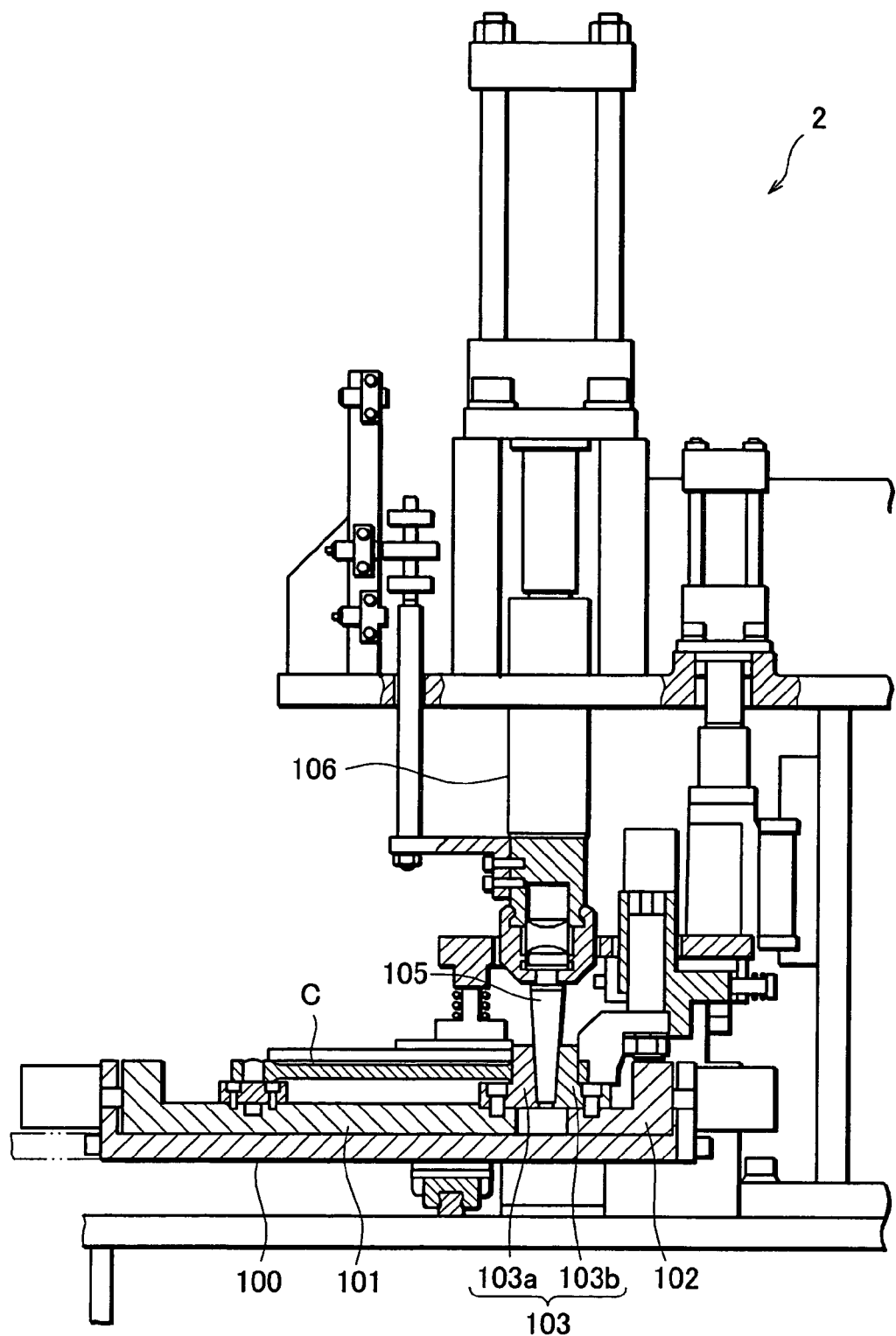
FIG. 7 is a side view showing a partial cross section of the connecting rod fracturing device in this embodiment.

The connecting-rod fracturing device 2 is, as shown in FIG. 7, is provided with a first supporting member 101 and a second supporting member 102 for horizontally supporting the large end and a rod part of the connecting rod C disposed movably in the direction separated from each other on a base 100 on which the connecting rod C is loaded, and a half-shaped mandrel 103 consisting of two mandrel halves 103a, 103b installed vertically on these supporting members 101, 102 and engaged with each other by each outer circumferential face being brought into contact with the inner face of the opening of the connecting-rod large end.

And there are provided a wedge 105 whose faces to be brought into contact with opposing end faces of each of the mandrel halves 103a, 103b form tapered faces, respectively, so as to uniformly separate and expand each of the mandrel halves 103a, 103b, an actuator 106 for applying a load to the wedge 105, and a control means, not shown, for applying a fracture load to fracture the opening instantaneously after each of the mandrel halves 103a, 103b is brought into contact with the inner face of the connecting-rod opening through the wedge 105 by applying a pressurization load to the actuator 106.

The method of fracturing the connecting rod using the connecting rod fracturing device 2 having such structure is carried out as follows. First, the mandrel 103 is energized by a spring in the direction in mutually opposing directions, and the mandrel is contracted to enter the opening of the large end of the connecting rod C. And the wedge 105 is pushed in till the state where the tapered portion at the tip end of the wedge is brought into contact with the mandrels 103a, 103b and is stopped once, and the actuator 106 applies a dynamic load to the wedge 105 through the above control means, by which an expansion force is applied to the above-mentioned fracture start portion of the connecting rod C to be fractured instantaneously.

The connecting rod C is, as mentioned above, not affected by heat from the adjacent recess part due to laser irradiation by the connecting-rod fracture start portion forming device, or the irradiating scum (dross) does not accumulate or re-coagulate in the recess part. Thus, the fracture start portion R of the connecting rod is formed according to the design dimension. And by using the connecting rod fracturing device according to this embodiment, the large end of the connecting rod can be fractured with a clean fracture face through the fracture start portion formed in such an ideal shape.

In this preferred embodiment, the connecting-rod fracture start portion forming device 1 and the connecting rod fracturing device 2 are shown separately, but it is needless to say that they may be integrated to be constituted as a connecting-rod fracture start portion forming/fracturing device.

Also, differently from this embodiment, parts made of a ductile metal other than a connecting rod can have the recess-part depth of 1.5 mm.

Furthermore, in this embodiment, the connecting rod C is mounted in the loading style on the first supporting member 101 and the second supporting member 102, but is is needless to say that the supporting form of the connecting-rod is not limited to this, but for example, a connecting-rod fracturing device of such a style is included that the connecting rod C is mounted on a lower side of the first supporting member and the second supporting member, both the supporting members are lifted in this state to guide and position the connecting-rod large end at the mandrel, and the wedge is struck into the mandrel.

The above-mentioned preferred embodiment of the present invention can be extensively applied to such a part as a bearing and a half spacer which has a through hole at its portion and is equally divided into two parts from a specific fracture portion by applying a tensile stress to create a half portion, and the fracture face of the half portion is brought into contact again for use.

The invention claimed is:

1. A method of forming a fracture start portion of a ductile metal part for forming the fracture start portion of the ductile metal part on an inner circumferential face of a through hole by irradiating laser to an opposing position of the inner circumferential face of the through hole of the ductile metal part having a predetermined through hole and by forming a plurality of recess parts at a predetermined interval from one opening to the other opening of the through hole, comprising:

forming a recess part by irradiating the laser onto the inner circumferential face of the through hole while defocusing from the inner circumferential face of the through hole of the ductile metal part by a predetermined amount while supplying an assist gas to a position of the laser irradiation, wherein the defocusing of the laser is conducted such that the shape of the recess part becomes widest at the opening of the recess; and forming a series of the recess parts linearly separated from each other by a predetermined distance on the inner circumferential face of the through hole of the ductile metal part by moving the laser linearly at a predetermined speed from the opening on one side to the opening on the other side of the inner circumferential face of the ductile metal part while irradiating the laser onto the inner circumferential face of the ductile metal part at a predetermined pulse, wherein the predetermined distance between recess parts is such that an outer circumference of an opening of a recess part does not contact an outer circumference of an opening of an adjacent recess part.

2. The method of forming a fracture start portion of a ductile metal part in claim 1, wherein a defocus amount of the laser from the inner circumferential face of the ductile metal part is in a range of +0.01 mm to +1.00 mm for a plus defocus amount and in a range of −0.01 mm to −1.00 mm for a minus defocus amount.

3. A method of fracturing a ductile metal part for fracturing the ductile metal part, comprising:

irradiating laser to an opposing position of an inner circumferential face of a through hole of the ductile metal part having a predetermined through hole and forming a plurality of recess parts separated by a predetermined distance at a predetermined interval from one opening to the other opening of the through hole so as to form a fracture start portion of the ductile metal part on the inner circumferential face of the through hole, each recess part being formed by irradiating the laser onto the inner circumferential face of the through hole while defocusing from the inner circumferential face of the through hole of the ductile metal part by a predetermined amount while supplying an assist gas to a position of the laser irradiation, wherein the defocusing of the laser produces recess parts having a shape that is widest at the opening, and the plurality of recess parts being formed linearly separated from each other with a predetermined distance on the inner circumferential face of the through hole of the ductile metal part by moving the laser linearly at a predetermined speed from the opening on one side to the opening on the other side of the inner circumferential face of the ductile metal part while irradiating the laser onto the inner circumferential face of the ductile metal part at a predetermined pulse, wherein the predetermined distance between recess parts is such that an outer circumference of an opening of a recess part does not contact an outer circumference of the opening of an adjacent recess part; and applying a tensile stress to the fracture start portion of the ductile metal part in a direction of widening the fracture start portion.

4. The method of fracturing a ductile metal part in claim 3, wherein a defocus amount of the laser from the inner circumferential face of the ductile metal part is in a range of +0.01 mm to +1.00 mm for a plus defocus amount and in a range of −0.01 mm to −1.00 mm for a minus defocus amount.

5. A method of manufacturing a fractured ductile metal part, comprising:

fracturing the ductile metal part by the method as set forth in claim 3 or 4.

* * * * *